United States Patent [19]
Taylor et al.

[11] 3,906,494
[45] Sept. 16, 1975

[54] MEANS FOR SYNCHRONIZING AN ANTENNA WITH A DIGITAL DATA DISPLAY

[75] Inventors: Robert A. Taylor; Ruy L. Brandao, both of Ft. Lauderdale, Fla.

[73] Assignee: The Bendix Corporation, Southfield, Mich.

[22] Filed: Dec. 18, 1973

[21] Appl. No.: 425,768

[52] U.S. Cl............................. 343/5 DP; 343/17.7
[51] Int. Cl.[2]....................... G01S 7/40; G01S 9/02
[58] Field of Search.......................... 343/5 DP, 17.7

[56] References Cited
UNITED STATES PATENTS

| | | | |
|---|---|---|---|
| 3,403,396 | 9/1968 | Van Popta et al................. | 343/5 DP |
| 3,500,402 | 3/1970 | Huele et al. ...................... | 343/5 DP |
| 3,569,966 | 3/1971 | Dunn................................ | 343/5 DP |
| 3,571,479 | 3/1971 | Horattas ...................... | 343/5 DP X |
| 3,683,373 | 8/1972 | Barnes et al...................... | 343/5 DP |
| 3,803,600 | 4/1974 | Brandao .......................... | 343/5 DP |

*Primary Examiner*—Malcolm F. Hubler
*Attorney, Agent, or Firm*—W. G. Christoforo; Bruce L. Lamb

[57] ABSTRACT

In a digital data display system adapted for use with radar, data derived from radar returns are stored in a memory for essentially real time display on a cathode ray tube. The memory is periodically updated by radar returns, with means being provided for determining the instantaneous position of the radar antenna with respect to the data position within the memory. A sensor on the antenna provides a signal for synchronizing the aforementioned means with the antenna and additionally provides fault indication should the antenna cease scanning.

5 Claims, 1 Drawing Figure

MEANS FOR SYNCHRONIZING AN ANTENNA WITH A DIGITAL DATA DISPLAY

RELATED PATENT APPLICATIONS AND PATENTS

The current invention is particularly adapted for use in data display systems such as those described in patent application Ser. No. 226,899, filed Feb. 16, 1972, now U.S. Pat. No. 3,803,600, for "Digital Sweep Generator in Video Storage Device for a Data Display System" and Ser. No. 291,116, filed Sept. 21, 1972, and now abandoned, for "A Data Display System Having a Multilevel Video Storage Device". Certain of the elements described in the present invention are similar or suitably identical to like elements described in the earlier applications, the inventors of which are the same as the inventors herein and which are assigned to the assignee herein.

BACKGROUND OF THE INVENTION

This invention relates to improvements to data display systems which are adapted for use with radar indicators and video storage devices therefor of the type wherein data is received at a relatively low rate and displayed at a different rate, generally many times faster, to obtain a relatively non-flickering, steady high resolution image. The invention particularly relates to an antenna synchronizing and fault indicating means for such systems.

A digital display system which provided the desired continuous bright display of video information was described in the above mentioned related prior patent applications. It was explained in those applications that the radar return signal was converted into a train or trains of binary bits and the bits temporarily stored in an input buffer at a selectable rate determined by the desired radar range. The bits were subsequently entered from the input buffer into a main memory where the bits were stored. The bits were optionally integrated to eliminate extraneous signals, such as those caused by noise or other interference. An output buffer was provided between the main memory and a cathode ray tube to permit selected groups of the memorized bits to be displayed in an ordered sequence on a cathode ray tube at a rate which could differ from the rate at which bits were entered into the input buffer. This method of sweep generation and storage permits the quality of the display to be independent of the pulse repetition frequency of the system. Therefore, a minimum pulse repetition frequency can optionally be used and still retain a relatively bright, continuous display. As a result, the average power consumed by the transmitter portion of the radar system could be less than that required by systems having a higher pulse repetition frequency.

In addition to the above described elements, means were described for synchronizing the operation of the input and output buffers and their associated gates with the radar antenna position. This was accomplished by providing a master oscillator means which generated a plurality of coherent control signals for controlling the various elements of the system in proper sequence. There was also described means for periodically updating the memory with new radar returns so that the radar display was essentially a real time display. This was accomplished by providing a counter which accumulated counts which were related to the radar pulse repetition frequency and whose count was further related to the azimuthal position of the radar antenna. In addition, through the use of the coherent control signals the counter count was also relatable to the position of the data within the memory thus permitting exact location of the memorized data which was to be updated.

The electronic elements described in the aforementioned patent applications provide little or no difficulty in synchronizing one with another through the use of the coherent control signals. A mechanically scanned antenna, however, presents a somewhat more formidable problem in maintaining synchronization between its drive and the electronic elements of the display system. In addition, in certain obvious embodiments of the aforementioned inventions it is possible and sometimes desirable to hold a display without updating. Unfortunately in certain fault modes holding of the display without updating can occur without notice to the observer.

SUMMARY OF THE INVENTION

Accordingly, the digital display system has been improved to provide means for synchronizing the azimuthal position of a radar antenna with an azimuth memory counter which records the azimuthal position of the antenna. This is accomplished through the use of an antenna sensor which generates an impulse signal each time the antenna passes in a predetermined direction through a predetermined point, usually an azimuth point. This signal is applied to the azimuth memory to set it to a count corresponding to the predetermined azimuth point. In addition, means are provided for blanking the range line on the display which is instantaneously being updated in the system memory. Since the range lines within the system memory are updated sequentially, a blank range line is continuously swept across the display providing an indication to an observer that update is occurring in a normal manner.

It is thus an object of this invention to provide means for synchronizing a scanned antenna with the electronic circuits of a digital data display system.

It is another object of this invention to provide an observable indication that a digital data display system is operating properly.

A still further object of this invention is to provide failure indication means for a digital radar display system.

These and other objects of the invention will be made obvious as the following description of the preferred embodiment proceeds.

The FIGURE is a block diagram of an embodiment of the invention.

DESCRIPTION OF THE PREFERRED EMBODIMENT

Figure 1:
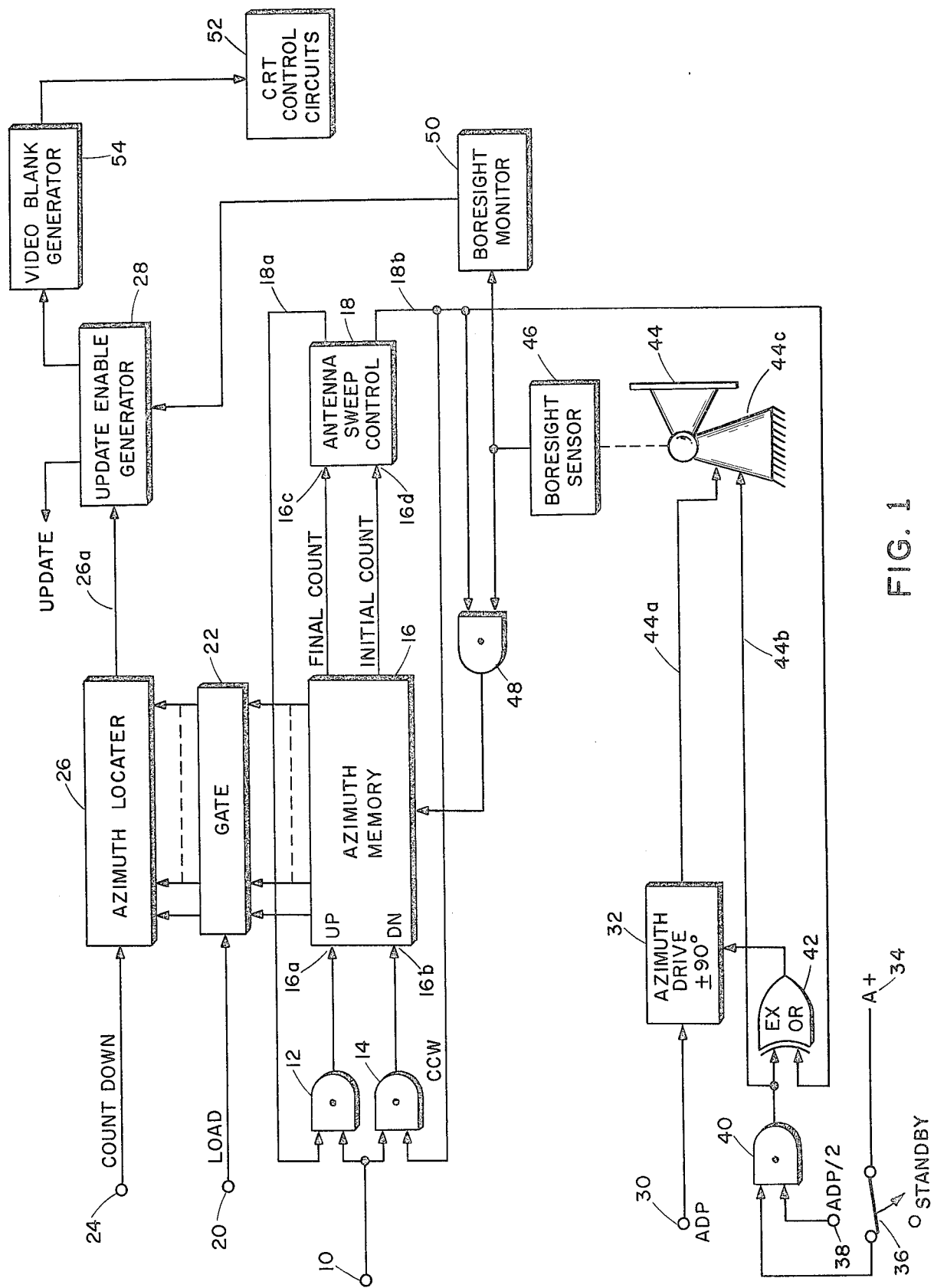

For the purposes of illustration, the present invention will be described as it is used in a digital display for a radar system suitable for use by aircraft. However, it should be obvious that the invention is suitable for other uses in other environments.

In this description, a word, range word, binary or digital word, is defined as a serial train of binary bits derived from a radar return signal and which comprise one range line of information.

In a digital display system suitable for use with the invention, a circulating memory has a bit capacity for storing an integral number of words, usually the number of words required for a complete scan through an associated display unit or cathode ray tube. Bits circulate through the memory at a data rate related to a predetermined first pulse frequency signal generated by a coherent control signal generator which also generates coherent second pulse signals after each group of first signals equal to the number of bits in a word and also generates coherent third pulse signals after each group of first signals equal to the bit capacity of the memory. In addition, PRF signals, which may be coherent with the other coherent control signals or non-coherent therewith but which in any event have some predetermined relationship with the coherent control signals, are generated, the PRF signals being a train of pulses which are generally synchronized with the radar transmissions from the associated radar transmitter and of course the resulting radar return signals.

Referring now to the FIGURE, azimuth memory stepping pulses are applied at a terminal 10 and through either AND gate 12 or 14 to an azimuth memory 16. The azimuth memory is simply a counter which counts pulses applied thereto from an initial count to a final count if the pulses are applied thereto at a port 16a communicating with the output of AND gate 12 or which counts from the final count to the initial count if the pulses are applied at port 16b which communicates with the output of AND gate 14. An antenna sweep control 18 controls which of gates 12 or 14 is qualified. For example, assuming that gate 12 is qualified so that the pulses at terminal 10 enter therethrough to terminal 16a to cause the azimuth memory to count up so that it eventually reaches the final count producing a signal at line 16c. This signal triggers antenna sweep control 18 to generate an output on line 18b and to extinguish a previous signal at line 18a. Accordingly, gate 12 closes and gate 14 is qualified so that the pulses at terminal 10 pass therethrough to terminal 16b to count azimuth memory 16 down. Upon reaching its initial count, line 16d is energized, thus resetting the antenna sweep control 18 to extinguish the signal at line 18b and to regenerate the signal on line 18a thus causing the above sequence to repeat.

The azimuth memory stepping pulses at terminal 10 are at such a pulse repetition rate that the number contained in the amimuth memory is related to the position of a radar antenna. These pulses may actually be related to pulses which drive the antenna, as explained with respect to this embodiment, or may be generated as the antenna is otherwise driven. In a unit actually built, the azimuth memory stepping pulses were the PRF signals.

When the memory which is a part of this system, but not shown, is to be updated, a pulse of the aforementioned third signal is applied at terminal 20, thus qualifying gates 22 to enter the number instantaneously contained in azimuth memory 16 into azimuth locater 26. The azimuth locater is also a counter which counts only in a down direction toward zero. Upon reaching zero the azimuth locater generates an output on line 26a to thus trigger the update enable generator 28 to generate an update signal which permits a word previously contained in an input buffer means to be entered into a proper place in the memory. This is accomplished by counting down the azimuth locater 26 by the pulses at terminal 24, these pulses being the second pulsed signals which, as was previously explained, are generated after each group of first signals equal to the number of bits in a word.

Azimuth drive pulses (ADP) are applied at terminal 30 which communicates with an azimuth drive ±90° device 32. Drive 32 is triggered by the rising edge of the azimuth drive pulses to create a 90° phase shift of signals applied thereto. The azimuth drive pulses divided by two (ADP/2) are impressed at terminal 38 and pass through gate 40, if qualified and an exclusive OR gate 42 to azimuth drive 32. Gate 40 is suitably controlled by a standby switch 36 which in the position shown connects a source of voltage, not shown, to one input of AND gate 40, thus permitting the ADP/2 signal to pass therethrough. In the alternate position, the standby position, switch 36 causes gate 40 to close. It will also be noted that line 18b is connected to the second input to exclusive OR gate 42. It will be remembered that this line is energized when azimuth memory 16 is counting down, corresponding to counter-clockwise rotation of an antenna 44. Exclusive OR gate 42 thus has the capability of inverting the ADP/2 signal applied as its second input when line 18b is energized or passing the ADP/2 signal directly when line 18b is unenergized. Also note that the ADP/2 signal is applied directly to the antenna drive circuits 44c of antenna 44, while the output from the antenna drive ±90° device 32 is also applied thereto. The antenna drive circuits are arranged in a known manner to drive the antenna in a counter-clockwise direction when the signals on line 44a lead the signals on line 44b by 90° and to drive the antenna in a clockwise direction when the signals on line 44a lag the signals on line 44b by 90°. The ADP/2 signal is suitably obtained by simply dividing the ADP signal in half, such as by a flip flop.

The ADP signal is obviously related to the azimuth memory stepping pulses and in the aforementioned embodiment of the invention actually built the ADP signal and the azimuth stepping pulses were the same signal and were actually the PRF signal.

A bore sight sensor 46 is mechanically ganged to antenna 44 to generate an output when the antenna is driven through a predetermined azimuth, suitably the bore sight. If the antenna is at that time turning in a counter-clockwise direction line 18b is energized so that gate 48 is qualified and the bore sight sensor output signal passes therethrough to azimuth memory 16. This signal will set the azimuth memory to a predetermined count, suitably the midpoint of its total count so long as the bore sight sensor generates its output at the antenna bore sight. This operation continually assures that the azimuth memory is synchronized with the motion of the antenna.

The bore sight sensor output signal is also applied to a bore sight monitor 50 which in response thereto generates a signal which is applied to the update enable generator 28. This signal from the bore sight monitor is a relatively long signal which, so long as it is generated, permits the update enable generator 28 to continually update the system memory. However, should the bore sight sensor 46 fail to generate its output over a predetermined period of time the update enable generator 28 will be disabled so that the memory cannot be further updated.

When update enable generator 28 generates its update signal it simultaneously generates a signal which is applied to the video blank generator 54 which in response thereto blanks the range line then being generated on the cathode ray tube. Since updating of the words in the memory occurs sequentially there normally appears on the cathode ray tube a blank line which sweeps at a rate related to the sweep rate of antenna 44. This sweeping line indicates that the system is synchronized and that updating of the memory is continually occurring. Disappearance of this line will indicate to the observer that updating of the memory is no longer occurring.

It should be noted with respect to this line blanking as an indication to the observer that the memory is being updated, that the sweeprate of the cathode ray tube is much higher than the antenna sweep rate. The presentation on the cathode ray tube will be completely written out generally at least once between each update of a memory word.

Although only a single embodiment of this invention has been shown it should now be obvious to one skilled in the art that certain alterations and modifications thereof are possible. The invention is thus to be limited only by the true scope and spirit of the appended claims.

The invention claimed is:

1. A radar digital display system having a memory for storing digitized radar return signals and wherein a plurality of coherent control signals are generated and including utilization means responsive to said coherent control signals for displaying data from said memory and additionally including means responsive to said coherent control signals for updating said memory in response to received radar returns, an improvement comprising:

means for sequentially generating a plurality of range lines whereon data related to data stored in said memory is sequentially displayed; and, means responsive to the updating of said memory for blanking a predetermined one of said range lines.

2. The system of claim 1 wherein the data stored in said memory is comprised of binary words related to radar return signals and wherein said utilization means includes means for sequentially generating a plurality of range lines whereon the data from related sequential binary words is displayed, said means for blanking comprising means for blanking the range line corresponding to the binary word being instantaneously updated.

3. The system of claim 1 with additionally:

scanning antenna means for receiving radar return signals;

means for generating a first signal when said antenna means scans through a predetermined position; and, counting means for counting signals related to said radar return signals and thus containing a number normally related to the position of said scanning antenna means, and including means for setting said counting means to a predetermined number in response to the first signal.

4. The system of claim 3 wherein said means for generating a first signal comprises means for generating said first signal when the antenna scans through the midpoint of its total scan, said counting means being set to a count midpoint in its total count in response to the first signals.

5. The system of claim 3 wherein said counting means is arranged to cyclically count in a first direction from a minimum count to a maximum count and then count in a second direction from the maximum count to the minimum count and additionally comprising;

means for generating a first pulse train related to the radar return signals; and, means for generating a second pulse train phase shifted in a first direction with respect to said first pulse train when said counting means is counting in the first direction, and phase shifted in a second direction with respect to said first pulse train when said counting means is counting in a second direction, said scanning antenna means being responsive to said first and second pulse trains as phase shifted with respect to one another in one sense for scanning in one direction and responsive to said first and second pulse trains as phase shifted with respect to one another in an opposite sense for scanning in a second direction.

* * * * *